No. 715,891. Patented Dec. 16, 1902.
W. A. SOMERBY.
NUT LOCK.
(Application filed Feb. 28, 1902.)

(No Model.)

Witnesses
T. P. Britt
M. Ethel Locher

Inventor
W. A. Somerby
By Chandlee & Chandlee
Attorneys

UNITED STATES PATENT OFFICE.

WILLIAM A. SOMERBY, OF BOSTON, MASSACHUSETTS.

NUT-LOCK.

SPECIFICATION forming part of Letters Patent No. 715,891, dated December 16, 1902.

Application filed February 28, 1902. Serial No. 96,153. (No model.)

*To all whom it may concern:*

Be it known that I, WILLIAM A. SOMERBY, a citizen of the United States, residing at Boston, in the county of Suffolk, State of Massachusetts, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it has for its object to provide a construction wherein the nut will be held securely from accidental displacement, while it may be forced from its locked position when desired.

A further object of the invention is to provide an element of the lock of such form and material as will cause it to enter between a bolt and the wall of an opening through which the bolt may be passed to prevent wabbling of the bolt in the opening.

Other objects and advantages of the invention will be understood from the following description.

Figure 1:
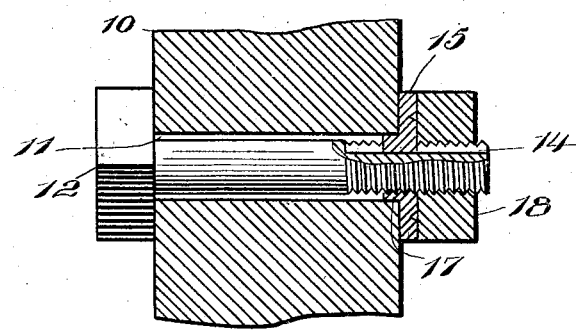
Figure 2:
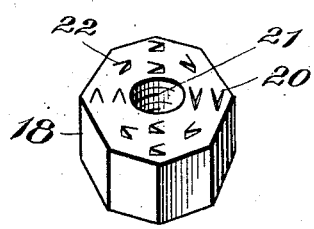
Figure 3:
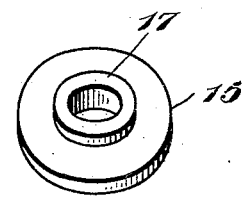
Figure 4:
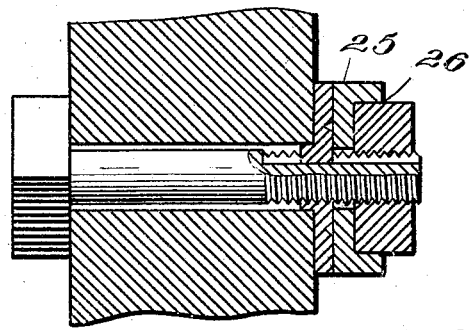

In the drawings forming a portion of this specification, and in which like numerals of reference indicate similar parts in the several views, Figure 1 is a section taken longitudinally through a bolt and a body through which the bolt is passed and including also a nut and its locking-washer, constructed and arranged in accordance with the present invention. Fig. 2 is a perspective view showing the under side of the nut. Fig. 3 is a perspective view showing the under side of the washer. Fig. 4 is a view similar to Fig. 1, wherein the locking-teeth are carried by a supplemental plate instead of by the nut.

Referring now to the drawings, there is shown a body 10, through which is a perforation 11, and through the perforation is passed a bolt 12, the threaded end of which projects beyond the face of the body and is provided with a longitudinal groove 14, which intersects the threads. Upon the threaded end of the bolt is disposed a washer 15, which is made of lead or other soft metal and upon the under face of which, at the edge of the central opening of the washer, is an annular flange 17, which is adapted to hug closely against the face of the bolt. The nut is shown at 18, and when screwed upon the end of the bolt it compresses the washer and the flange thereof, and the metal of the flange is caused to flow in part into the perforation 11 between the bolt and the wall of the perforation. The metal of the flange thus acts as a packing for the perforation, so that the bolt is held snugly and wabbling of the bolt in the perforation is prevented.

On the under face of the nut 18 are formed pairs of teeth 20, said teeth being projected downwardly from the nut and the teeth of each pair lying side by side in the line of a diagonal of the nut and at one side of the threaded perforation 21 thereof. Alternating with the pairs of teeth 20 are single teeth 22, which also project downwardly from the bottom of the nut, and all of the teeth are triangular, as shown, and project in the same direction rotatably of the nut. The outer teeth of all of the pairs of teeth 20 lie with their apices in a common circle concentric with the perforation of the nut, while the inner teeth of all of the pairs lie with their apices in a smaller circle concentric with the perforation of the nut, while the apices of the teeth 22 lie in a common circle concentric with the nut and between the first two circles. As a result of this arrangement of the teeth, as the nut is screwed down against the washer three separate channels are plowed in the upper face of the washer. The pressure of the teeth against the washer is such that after the nut is screwed up should the nut tend to reverse the teeth will engage into the metal of the washer and prevent returned rotation of the nut, except by application of considerable pressure thereto. The object in offsetting the series of single teeth with respect to the pairs of teeth is to provide for partly closing the channels in the washer. The pairs of teeth 20 throw up two furrows, while the teeth 22 throw up counter-furrows, which squeeze or force the metal of the first furrows, so that said metal is caused to flow and partly fill the channels formed by the teeth 20 by reducing the widths thereof. In this way the middle channels from each pair of teeth to the following single tooth are reduced in width, while the outer channels from each single tooth to the following pair of teeth are reduced in width, and in consequence proper biting of the teeth is insured.

In Fig. 4 of the drawings there is shown a modification wherein the teeth are carried by a supplemental plate 25, in which is formed a seat 26 in its outer face to receive the nut, it being understood that with this form of the invention the supplemental plates and washers may be sold for use in connection with any specific nut and threaded body.

A longitudinal slot 25 is formed in the stem of the bolt and permits the metal of the washer to positively engage the bolt, so that the washer is held positively against rotation.

In practice modifications of the specific constructions shown may be made, and any suitable materials and proportions may be used for the various parts without departing from the spirit of the invention.

What is claimed is—

1. The combination with a perforated body and a threaded body passed through the perforation and fitting loosely therein, of a malleable washer disposed upon the threaded body and having an annular flange surrounding its opening and bridging the perforation between the wall thereof and the threaded body, and a nut screwed upon the threaded body and against the washer to force the flange into the perforation, the threaded body having a slot therein to receive a portion of the malleable washer.

2. The combination with a threaded body and a malleable plate surrounding said body, of a nut, and teeth carried by and projecting from the nut in the direction of the malleable plate, said teeth being arranged in concentric annular series of different radii and projecting all in the same direction rotatably said body having a longitudinal slot into which the metal of the plate may flow.

3. The combination with a perforated body and a threaded body passed through the perforation and fitting loosely therein, of a malleable washer disposed upon the threaded body and having an annular flange surrounding its opening and lying in the perforation between the wall thereof and the threaded body, and a nut screwed upon the threaded body and against the washer to force the flange into the perforation, said threaded body having a longitudinal slot to receive a portion of the metal of the washer.

4. The combination with a body having an opening therein and a threaded body engaged with the opening, the diameter of the opening being greater than the diameter of the body, of a malleable washer disposed upon the threaded body and having a continuous flange surrounding the opening, the thickness of the flange being greater than the width of the interspace between the threaded body and the wall of the opening, and a nut screwed upon the threaded body against the washer to cause the flange thereof to flow into said interspace to pack the threaded body and prevent lateral movement thereof in the first-named opening.

In testimony whereof I affix my signature in presence of two witnesses.

WILLIAM A. SOMERBY.

Witnesses:
F. R. ROBINSON,
FRED P. HAYWARD.